(12) United States Patent
Tomar et al.

(10) Patent No.: US 10,205,189 B2
(45) Date of Patent: Feb. 12, 2019

(54) SYNTHESIS OF NOVEL SULFUR-CARBON NANO-NETWORK COMPOSITE AS CATHODE FOR RECHARGEABLE LI—S BATTERIES

(71) Applicants: Maharaj S. Tomar, Mayaguez, PR (US); Arun Kumar, Mayaguez, PR (US); Moises M. Gallozzo, Mayaguez, PR (US)

(72) Inventors: Maharaj S. Tomar, Mayaguez, PR (US); Arun Kumar, Mayaguez, PR (US); Moises M. Gallozzo, Mayaguez, PR (US)

(73) Assignee: UNIVERSITY OF PUERTO RICO, San Juan, PR (US)

( * ) Notice: Subject to any disclaimer, the term of this patent is extended or adjusted under 35 U.S.C. 154(b) by 0 days.

(21) Appl. No.: 15/431,696

(22) Filed: Feb. 13, 2017

(65) Prior Publication Data
US 2018/0166737 A1    Jun. 14, 2018

Related U.S. Application Data

(60) Provisional application No. 62/293,815, filed on Feb. 11, 2016.

(51) Int. Cl.
| | |
|---|---|
| *H01M 10/05* | (2010.01) |
| *H01M 4/13* | (2010.01) |
| *H01M 10/052* | (2010.01) |
| *H01M 4/136* | (2010.01) |
| *H01M 10/39* | (2006.01) |
| *H01M 4/583* | (2010.01) |
| *H01M 4/133* | (2010.01) |
| *H01M 4/04* | (2006.01) |
| *H01M 4/134* | (2010.01) |
| *H01M 4/139* | (2010.01) |
| *H01M 4/38* | (2006.01) |
| *H01M 4/62* | (2006.01) |
| *H01M 4/02* | (2006.01) |

(52) U.S. Cl.
CPC ........... *H01M 10/052* (2013.01); *H01M 4/04* (2013.01); *H01M 4/13* (2013.01); *H01M 4/133* (2013.01); *H01M 4/134* (2013.01); *H01M 4/136* (2013.01); *H01M 4/139* (2013.01); *H01M 4/38* (2013.01); *H01M 4/382* (2013.01); *H01M 4/583* (2013.01); *H01M 4/625* (2013.01); *H01M 10/399* (2013.01); *H01M 2004/021* (2013.01); *H01M 2004/027* (2013.01); *H01M 2004/028* (2013.01)

(58) Field of Classification Search
None
See application file for complete search history.

(56) References Cited

U.S. PATENT DOCUMENTS

2017/0141383 A1* 5/2017 Dadheech ............. H01M 4/366

* cited by examiner

*Primary Examiner* — Scott J. Chmielecki
(74) *Attorney, Agent, or Firm* — Hoglund & Pamias, PSC; Roberto J. Rios

(57) ABSTRACT

A synthesis technology for sulfur-carbon Nanocomposite is provided, which was achieved by ultrasonification to allow formation of homogeneously distributed Sulfur nanoparticles on Carbon. Sulfur is uniformly distributed with mesoporous "functionalized carbon" to produce Sulfur-Carbon (S—C) nano-link. The performance of an EC cell assembled using the (S—C) nanocomposite cathode in Li-S battery has a capacity >910 mAh/g at low current density without fading up to 80 cycles with different C-rate. The synthesis process is cost effective and scalable for large quantity of (C—S) nanocomposites.

8 Claims, 9 Drawing Sheets
(7 of 9 Drawing Sheet(s) Filed in Color)

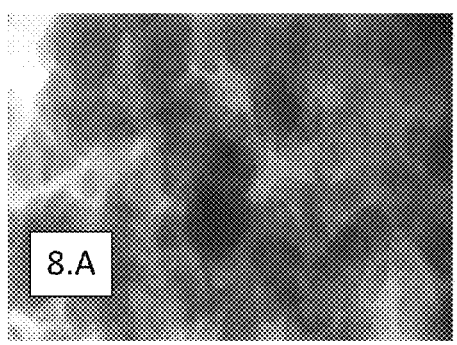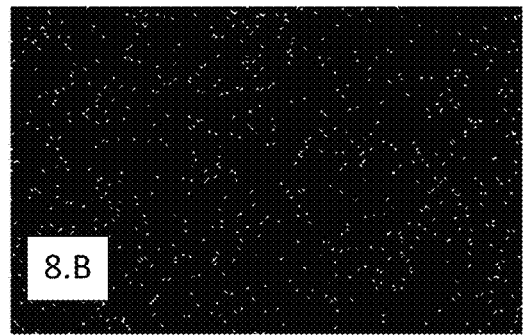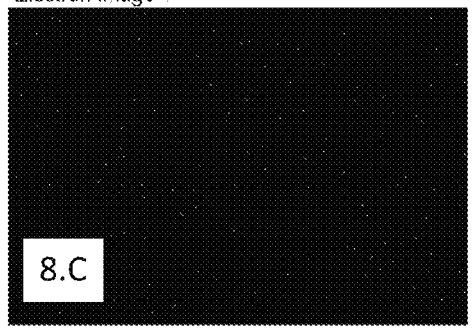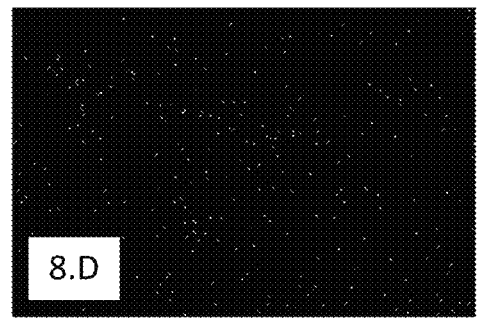
FIGURE 8(A), 8(B), 8(C), and 8(D)

Table 1.

| Cycles | Ru(Ω) | R14(Ω) | Y015 | a16 | W17 e-3 | R6 (Ω) | Y07 | a8 |
|--------|-------|--------|------|-----|---------|--------|-----|-----|
| 30 | 6.167 | 132.0 | 3.000e-6 | 850.7e-3 | 5.430e-3 | 100.0 | 2.950e-15 | 1.000 |
| 50 | 3.061 | 118.1 | 4.883e-6 | 802.1e-3 | 2.165e-3 | 89.27 | 1.103e-3 | 797.9e-3 |
| 120 | 2.501 | 81.66 | 5.602e-6 | 797.2e-3 | 10.00e-6 | 52.0 | 4.370e-3 | 637.8e-3 |

SYNTHESIS OF NOVEL SULFUR-CARBON NANO-NETWORK COMPOSITE AS CATHODE FOR RECHARGEABLE LI—S BATTERIES

BACKGROUND OF THE INVENTION

Batteries Phenomena and Mechanism

Batteries may be divided into two principal types, primary batteries and secondary batteries. Primary battery can be used once until it discharges. Secondary batteries are also called rechargeable batteries because they can be recharged to use again. In secondary batteries, each charge/discharge process is called a cycle, and eventually reaches an end of their usable life after many charge/discharge cycles. Electrochemical cell constitutes of a cathode (positive) and anode (negative) electrodes, an electrolyte (an ionic conductor) to chemically connect the electrodes, and an insulator separating the electrodes. In actual operation, the secondary battery converts the chemical energy into electrical energy. During discharging of battery, negative charge (electrons) leave the anode and move in external circuit, while the positive charge (Li-ion) travel through the electrolyte to reach cathode. During charging, Li-ion moves from the cathode to anode via electrolyte depending on the electrochemical potential (ECP) between the cathode and anode to maintain charge neutrality. Charge-discharge may be a complex process due to the nature of cathode, anode, and electrolytes. Li—S cathode is very poor conductor due to the insulating nature of sulfur which causes capacity fading. Therefore, high conductivity is an essential requirement. Since carbon is highly conductive, S—C composite is an obvious choice, but creation of conduction link between C and S is crucial. Nano-links between carbon and sulfur can provide the conducting channels, if one could synthesis them. Nano-links facilitate conduction of the Li-ion in Li—S cathode. The discloser provides the synthesis routes of C—S nanocomposite with nano-network which is highly conductive with long cycle life in actual testing with assembled battery.

Unlike most rechargeable batteries, where ion moves via intercalations into and out of a crystal lattice, lithium-sulfur batteries are based on topotactic chemical reaction at the anode and cathode (16 Li+$S_8$⇔$Li_2S$). But, theoretical capacity (1675 mAh/g) of Li—S cathode is much higher than that of the oxide based cathodes (<200 mAh/g). Li—S also operates at a safer voltage range (1.5 V to 3 V), but the poor conductivity of Li—S is very serious problem. High theoretical capacity of Li—S is due to the ability of sulfur to accept two electrons per atom. The high-order polysulfides ($Li_2S_n$, 4<$S_n$<8) produced during the initial stage of discharge process, are soluble in the electrolyte and move toward the lithium metal anode, where they are reduced to lower-order polysulfides. Moreover, solubility of these high-order polysulfides in the liquid electrolytes and the nucleation of insoluble low-order sulfides (e.g. $Li_2S_2$ and $Li_2S$) results in poor capacity retention and low coulombic efficiency. Since carbon is an excellent electric conductor, C—S material system was an obvious choice do develop conductive cathode. Based on this fact various investigators have intensively studied the routes for the synthesis of C—S material system.

Several synthesis approaches have been pursued including composites with carbon black and nanostructured carbon with considerable capacity fading. But, Li—S synthesized by mesoporous carbon with amorphous sulfur and polymer have exhibited high reversible capacity of approximately 1000 mAh/g up to 20 cycles. Most traditional methods to synthesize sulfur-carbon composites include processing by sulfur melting route, resulting in high manufacturing costs due to additional energy consumption. Several reports have noted that the sulfur content in the sulfur-carbon composites synthesized by the sulfur melting route is limited to a relatively low specific capacity to obtain acceptable electrochemical performance, which leads to a lower overall capacity of the cathode. Synthesizing homogeneous sulfur-carbon composites through conventional heat treatment is complicated and still challenging. In this method of synthesis, sulfur is heated above its melting temperature, and the liquid sulfur is then diffused to the surface or into the pores of carbon substrates to form the sulfur-carbon composite. A subsequent high-temperature heating step is then required to remove the superfluous sulfur on the surface of the composites, and leads to waste some sulfur. Thus, the conventional synthesis by the sulfur-melting route may be difficult for scaling to obtain a uniform industry level demand for sulfur-carbon composite. Recently, another alternative of sulfur deposition to synthesize core-shell carbon/sulfur material for Li—S batteries was introduced. The capacity fading after one cycle (solubility of polysulphides) was the clear result. The carbon-sulfur composite material where sulfur particles are wrapped by polyethylene glycol (PEG) and carbon sheets showed stable capacities of 600 mAh/g over 100 cycles. Also, one-port reaction has been developed to obtain carbon-enveloped sulfur composite which had high sulfur content of 87 wt % with acceptable cycling stability. Despite the fact that carbon-sulfur network was found effective to enhance the cycle performance of Li—S batteries, its synthesis is usually complicated and challenging for large-scale application. Most of the solution-based synthesis without heat treatment produces large crystalline sulfur particles with poor rate performance due to lack of the full utilization of active material. Thus, there remains urgent need for a highly functional and readily synthesized sulfur-carbon cathode material for Li—S battery. Nano-network links are very effective to provide new electrical paths to Li-ion. We used this concept for the material synthesis and the performance of Li—S cell assembled with this nano-composite cathode with battery capacity >910 mAh/g up to 80 cycles.

SUMMARY OF THE INVENTION

According to an aspect of the invention, a method of synthesizing a sulfur-carbon cathode material for a Li—S battery is provided.

According to another aspect of the invention, a first precursor solution is prepared by ultrasonicating elemental sulfur in a first solvent and separately a second precursor solution is prepared by ultrasonicating sodium sulfide in a third solvent and fourth solvent.

According to still another aspect of the invention, the first and said second precursor solutions are mixed and carbon black is added to the precursors mixture and ultrasonicated to effectively synthesize a carbon-sulfur nanocomposite material.

According to yet another aspect of the invention, the first solvent is Toluene, the second solvent is Hexane and the third solvent is ethanol.

According to one aspect of the invention, the first precursor solution is ultrasonicated for 30 minutes and the second precursor solution is ultrasonicated for 60 minutes.

According to one aspect of the invention, the first precursor solution is ultrasonicated at 45° C. and the second precursor solution is ultrasonicated at 45° C.

According to another aspect of the invention, the carbon black and the precursors mixture is ultrasonicated at 45° C.

According to still another aspect of the invention, a sulfur-carbon cathode material for a Li—S battery is prepared.

According to yet another aspect of the invention, amorphous sulfur nanoparticles are homogeneously distributed on a carbon surface producing carbon-sulfur nano-links that increase the transport of Li-ion in the sulfur-carbon cathode.

In accordance to one aspect of the invention, the amorphous state of sulfur particles in the material has close contact with the carbon substrate, preventing the dissolution of polysulfides during the use of the cathode.

In accordance to another aspect of the invention, Li—S battery comprising the sulfur-carbon cathode is provided.

According to another aspect of the invention, the Li—S battery of claim includes a metallic lithium anode, a separator, and an electrolyte.

According to still another aspect of the invention, the sulfur-carbon cathode provides a capacity greater than 910 mAh/g at low current density without fading up to 80 cycles.

BRIEF DESCRIPTION OF THE DRAWINGS

The patent of application file contains at least one drawing executed in color. Copies of this patent or patent application publication with color drawing(s) will be provided by the Office upon request and payment of the necessary fee.

Further features and advantages of the invention will become apparent from the following detailed description taken in conjunction with the accompanying figures showing illustrative embodiments of the invention, in which:

FIGS. 8(A)-8(D) show elemental images of the composite, shown uniformly distributed sulfur and carbon.

DESCRIPTION OF THE INVENTION

Figure 2:
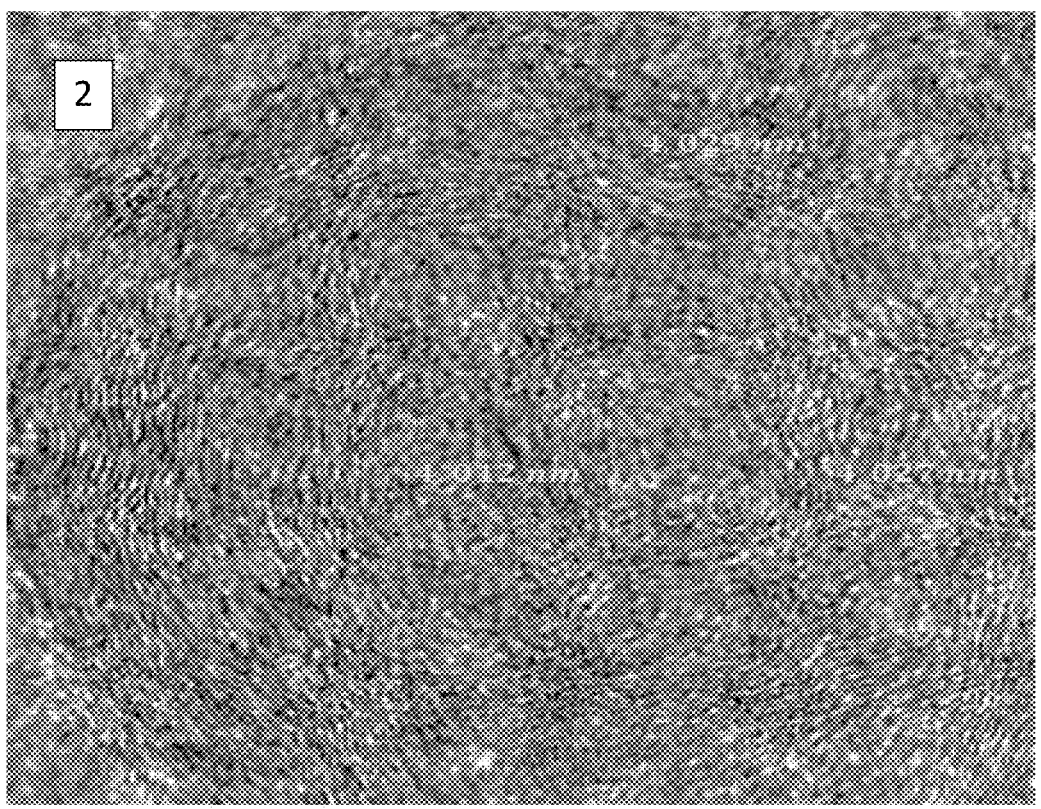
FIG. 2 shows a HRTEM image at shown sulfur crystalline uniformly.
Figure 3:
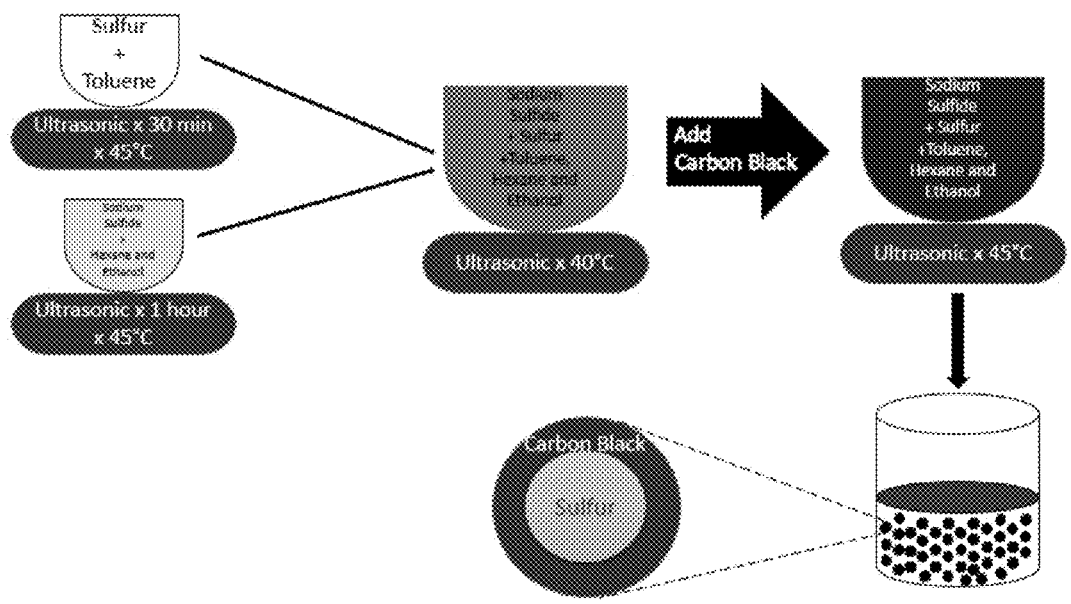
FIG. 3 shows a schematic for the synthesis of sulfur-carbon black nanocomposites.

The following abbreviations are commonly used throughout the specification:
Li$^+$: lithium ion
Li: Li elemental
S: sulfur
C—S: carbon sulfur composite
Li—S: lithium-sulfur
SEM: scanning electron microscope
XRD: X-ray diffraction
CV: cyclic voltammetry
EC: Electrochemical In order to achieve the goal, "functionalized carbon black" was used as carbon source. This carbon source is few atoms thick formed from double bonded carbon atoms and may look like honey comb appearance. The cathode contains amorphous sulfur nanoparticles distributed on carbon surface as revealed by HRTEM (FIG. 2). As carbon is conductive and sulfur provides extra electrons, C—S nano-links provide effective channel for the transport of more Li-ion in C—S cathode with the consequences of achieving high capacity and excellent cycleability.

The current disclosure relates to cathodes for rechargeable lithium-sulfur (LiS) batteries containing a Nano-composite of sulfur and carbon. In particular, the cathode contains amorphous sulfur nanoparticles distributed on a carbon surface. Discloser also relates synthesis methods of such C—S cathode using functalized carbon black, and the EC performance of the cell assembled with this material. "Carbon" as used in the present disclosure, may include any sheet-like material that is substantially few atoms thick and formed from double bonded carbon atoms. Carbon may also be characterized by the honeycomb appearance of the carbon atoms. The study of carbon remains a highly dynamic field. Accordingly, carbon, as used herein, unless otherwise specifically indicated, includes carbon variations presently in existence as well as any developed in the future otherwise compatible with this disclosure.

Sulfur-Carbon Nanocomposites

Sulfur-carbon black nanocomposites of the present disclosure may contain crystalline sulfur nanoparticles distributed on a carbon black surface. These nanoparticles may be substantially made of elemental sulfur. The nanoparticles may be distributed uniformly on the carbon black surface. In one disclosure, sulfur microparticles may be substantially absent from the sulfur-carbon nanocomposite. The carbon may be in the form of a sheet, although when cathodes are formed, layers of carbon sheets may be used, so long as they remain sufficiently spaced to allow lithium ion (Li+ movement). Cathodes may also contain other materials to improve conductivity or mechanical stability, such as metal foil or other conductive foil on which the sulfur-carbon nanocomposite is deposited. The close electrochemical contact between sulfur nanoparticles and the hydroxylated carbon, which is highly conductive, allows the formation of cathodes that, when placed in a LiS battery exhibit reversible discharge capacities of at least 913 mAh/g after 80 cycles at 10 mA/g. These batteries may also exhibit a Coulombic efficiency of at least 97%. Additionally, the amorphous state of sulfur particles in the nanocomposite has close contact with the carbon substrate, preventing the dissolution of polysulfides during the use of the cathode. Sulfur nanoparticles provide short pathways for ion and electron transport. The morphology of the sulfur-carbon nanocomposite allows complete electrolyte penetration and absorbs the strain from cycling-induced volume changes during battery use. Unless otherwise indicated by the context, the term "battery" as uses herein includes both simple electrochemical cells and more complex multi-cell arrangements. According to one embodiment, the disclosure provides a battery with a cathode containing a sulfur-carbon nanocomposite as described herein, an anode suitable for use with the cathode and in which lithium ions (Li$^+$) can intercalate or be deposited, such as lithium metal (Li), lithiated silicon, lithiated tin, Li$_4$Ti$_5$O$_{12}$, lithium containing oxides or sulfides, or other lithium containing materials, and an electrolyte suitable for use with the cathode and anode, such as lithium trifuoromethane sulfonate (LiCF$_3$SO$_3$, 1 M) or other lithium salts, such as lithium bis(trifuoromethanesulfonyl)imide (LITFSI, 1 M)) dissolved in 1,3-dioxalane (DOL) and 1,2-dimethoxyethane (DME) (1:1, vol, or other solvents, such as tetra (ethylene glycol) dimethyl ether. The battery may also contain a separator to electrically insulate the cathode and anode. In some batteries, the separator may also be the electrolyte. Batteries of the present disclosure may also contain contacts, a casing, or wiring. In the case of more sophisticated batteries, they may contain more complex components, such as safety devices to prevent hazards if the battery over heats, or short circuits. Batteries may be in traditional forms, such as coin cells or jelly rolls, or in more complex forms such as prismatic cells. Batteries may contain more than one electrochemical cell and connect in parallel or series as required. They may be usable in consumer electronics including cameras, cell phones, gaming devices, or laptop computers. They may also be usable in much larger devices, such as electric automobiles, motorcycles, buses, delivery trucks, trains, or boats. Furthermore, batteries according to the present disclosure may have industrial uses, such as energy storage in connection with energy production, for instance in a smart grid, or in energy storage for factories or health care facilities, for example in the place of generators.

Methods of Forming Sulfur-Carbon Nanocomposites

Figure 1:
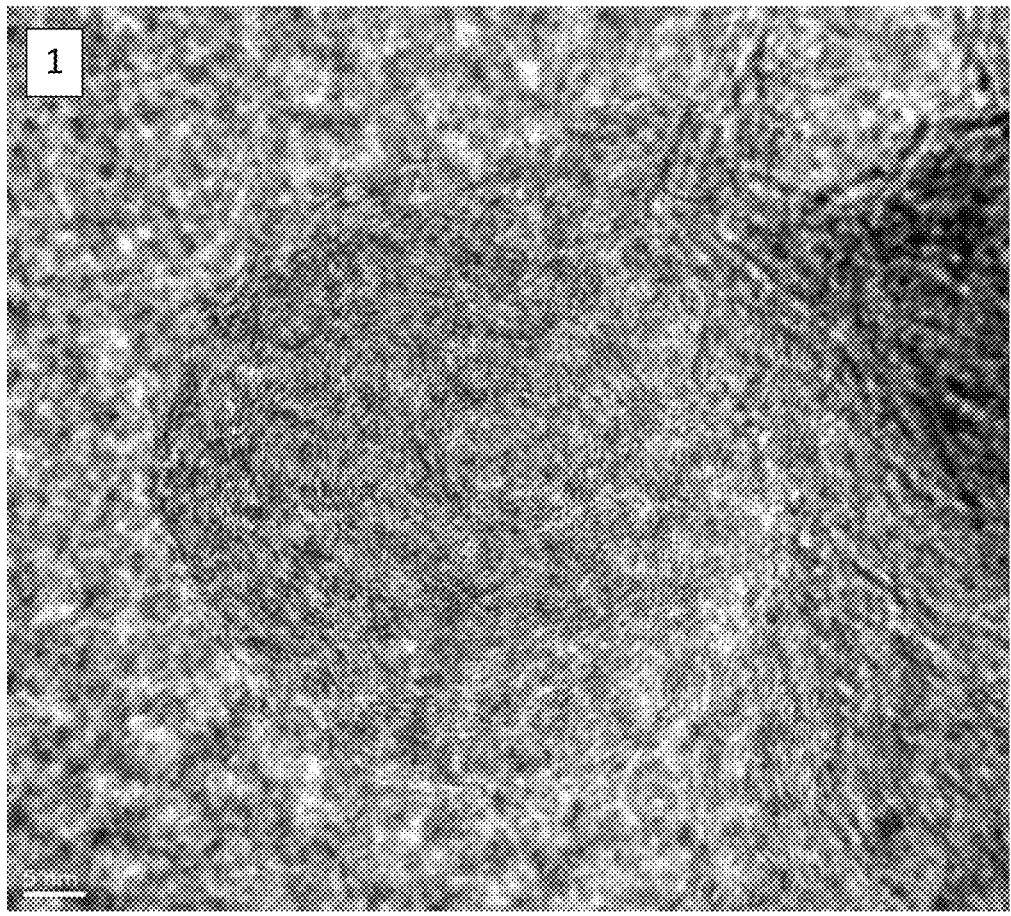
FIG. 1 shows a HRTEM image.

Sulfur-carbon nanocomposites of the present disclosure may be formed using in situ sulfur deposition of carbon at room temperature. In particular, the sulfur-carbon nanocomposites may be formed through heterogeneous nucleation of bonded sulfur atoms through extraction from a sulfur salt solution. Carbon nanosheets may be prepared by any suitable method, including, but not limited to, ultrasonication-hydrothermal methods, ball-milling methods or Chemical Vapor Deposition methods. Carbon may be in the form of sheets, such as carbon nanosheets. The sulfur salt solution may be any salt solution from which sulfur may be extracted. Sulfur nanoparticle deposition may be substantially completed in less than one hour. Due to strong interactions between the carbon and sulfur in the sulfur salt in solution and any intermediate polysulfides, the sulfur nanoparticles formed on the carbon surface. In a particular embodiment, shown in FIG. 1: carbon is prepared by a sonication method. A sulfur-containing solution may be prepared as by dissolving of sodium thiosulfate. The sulfur-containing solution may be brought into contact with the carbon under ultrasonication and with addition of hexane, resulting in the formation of a sulfur-carbon nanocomposite without acid treatment.

Synthesis, Structural, and Electrochemical Analysis of a Sulfur-Carbon Nanocomposite Sulfur/Carbon nanoparticles was preparation: dissolved elemental sulfur (Sigma Aldrich, 99.998%, fw 32.06) in 10 mL Toluene by 30 min in ultrasonic; separately dissolved sodium sulfide (Na$_2$S.xH$_2$O, Sigma Aldrich, 99.8%, fw 78.04) in 50 mL Hexane, 50 mL ethanol in 1 hour in ultrasonic at room temperature. Ultrasonic was maintained during the mixing. All precursor solutions were mixed and carbon black was added and maintained in the ultrasonic to obtain homogeneous solution. Finally, the solution was evaporated until completely dried. We call it C—S nanocomposite.

Figure 4:
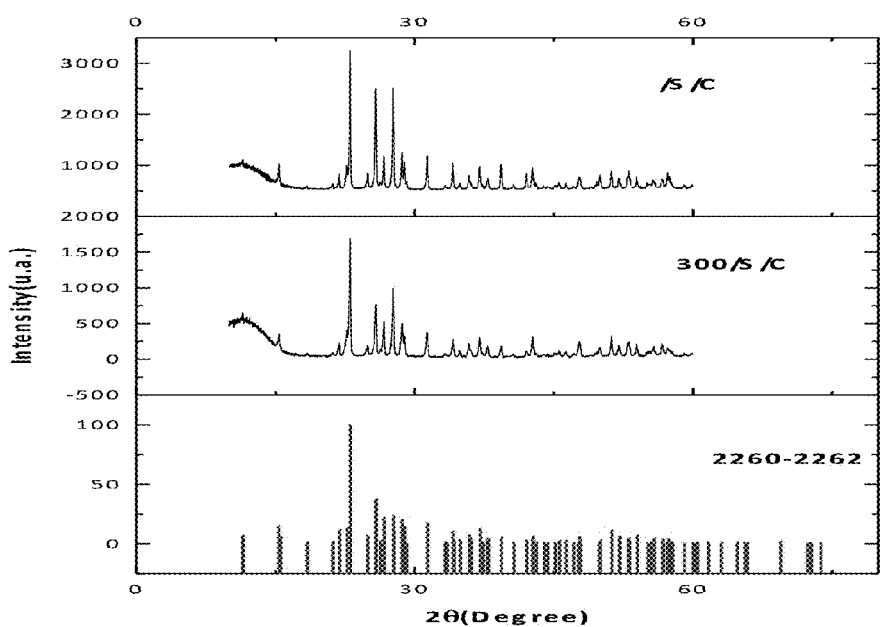
FIG. 4 shows XRD pattern of sulfur-carbon with different temperature analysis with JCPDS.
Figures 5A, 5B:
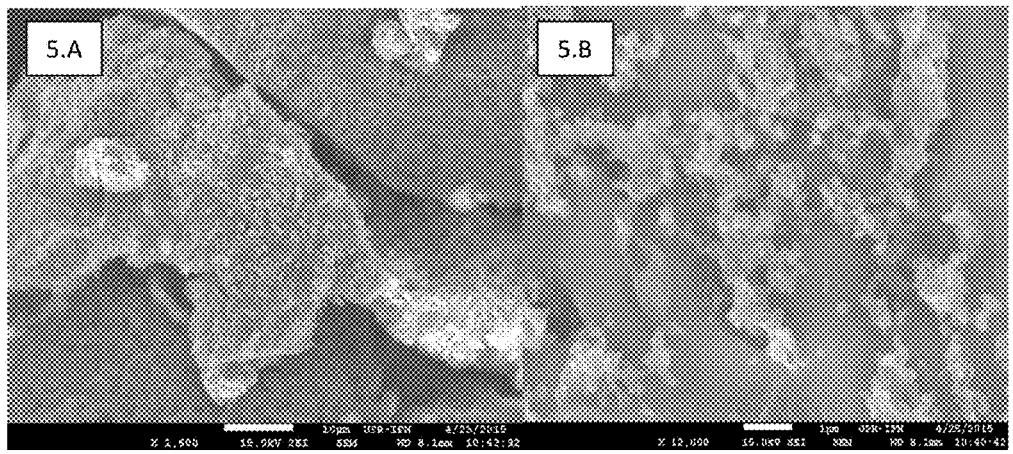
FIGS. 5(A)-5(B) show SEM images of sulfur-carbon composite.
Figure 6:
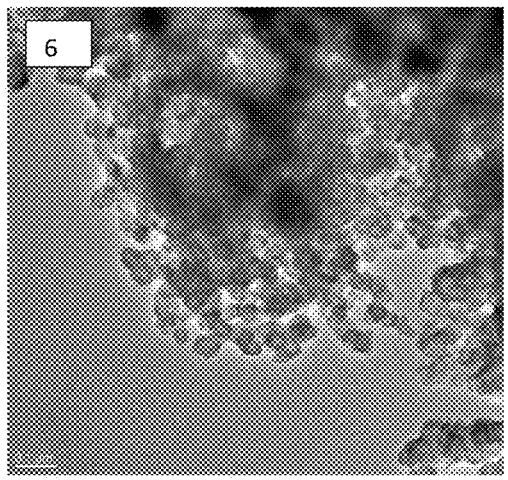
FIG. 6 shows TEM image at 0.1 micrometer.
Figure 7:
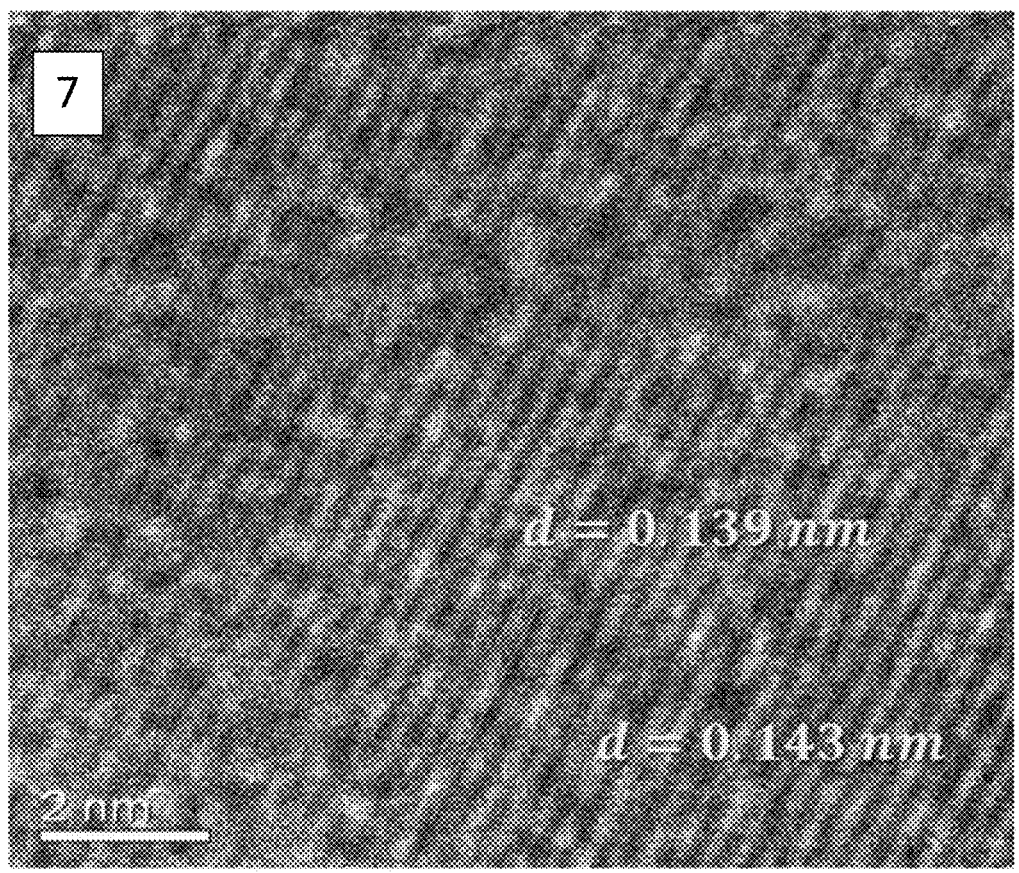
FIG. 7 shows HRTEM image at 2 nm scale the lattice index diameter is 0.139 nm.

Sulfur-carbon nanocomposites thus formed were subjected to structural and chemical analysis. The morphology of sulfur-carbon nanocomposite was examined with a FESEM Quanta 650 scanning electron microscope (SEM) and high-resolution transmission electron microscopy (HR-TEM) were performed (under the JEOL, JSM 7500F field emission scanning electron microscope for the morphology studies and elemental mapping). Sulfur-carbon nanocomposite possesses a sponge-like morphology with fully exfoliated carbon nanosheets. FIG. 5A and FIG. 5B shows the morphology of the carbon nanosheet, in which no bulk-sulfur particles could be observed. Elemental mapping and the composition of the nanocomposite was analyzed by TEM (FIG. 6). Results are shown in FIGS. 8A, 8B, 8C and 8D. Homogenous distribution of sulfur and carbon nanosheet was observed, indicating that sulfur is highly-dispersed in the form of nanoparticles. Crystal structural characterization was carried out with a Philips X-ray Diffractometer with Siemens D500 using CuKα radiation with 2θ=10° to 60° at a scan rate of 005° s$^{-1}$. FIG. 4 shows the XRD on sulfur-carbon powder, pristine carbon nano sheets, and the sulfur-hydroxylated carbon nanocomposite. The XRD pattern shows sulfur-carbon nanocomposite. Most likely it indicates that the sulfur-carbon nanocomposite interact with the sulfur precursor via a hydrogen-bonding interaction.

Figure 9:
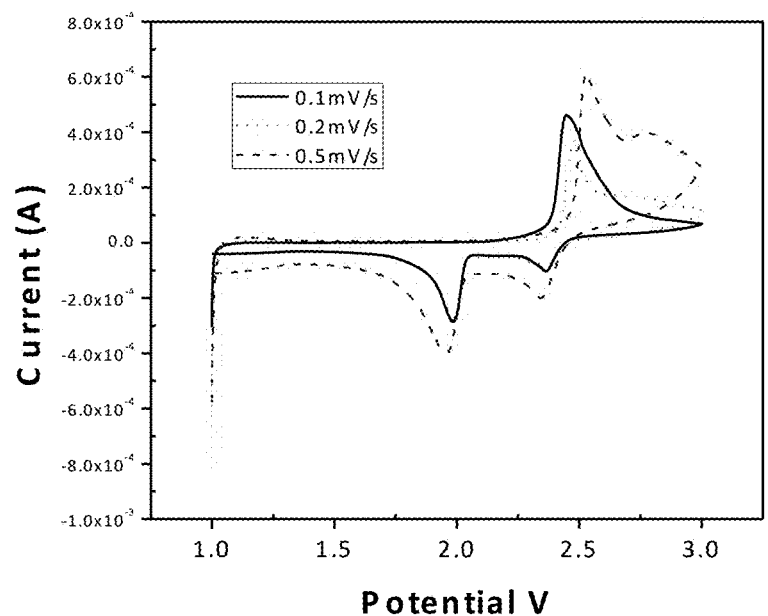
FIG. 9. shows cyclic voltagramm at different scan rate.

The sulfur-carbon nanocomposite was used as cathode and CR2032 coin cells were assembled in blow box (MBraun) for electrochemical characterization. Testing cathode was prepared by mixing sulfur-carbon nanocomposite (80 wt %), superP (10 wt %), and PVDF binder (10 wt %) in an N-methylpyrrolidone (N MP) solution. Well-mixed slurry was then spread onto aluminum foil and was dried in an oven at 50° C. Our CR2032 coin cell consists of metallic lithium anode, a Celgard separator, sulfur-carbon nanocomposite, and electrolyte assembled in an argon filled glovebox. The electrolyte used was LiCF$_3$SO$_3$(1M) dissolved in 1,3-dioxalane (DOL) and 1,2-dimethoxyethane (DME) (1:1, vol). Galvanostatic cycling was conducted with battery cycler (Gamry) at 2.5-1.5 V (vs. Li/Li") at room temperature. FIG. 9 shows the cyclic voltammetry (CV) of the half-cell within the voltage window of 2.5 V-1.5 V at the scan rate 0.2 mV/s. The reduction peak at 2.4 V shifted to higher potentials and the oxidation peak at 2.46 V shifted to lower potentials with different scan rate, indicating the improved reversibility of the cell. Sulfur was slowly converted to free S, but highly dispersed reactive materials upon cycling, which is consistent with the later stable CV profiles. This result suggests that carbon and sulfur are together and sulfur undergoes redox reaction.

Figure 10:
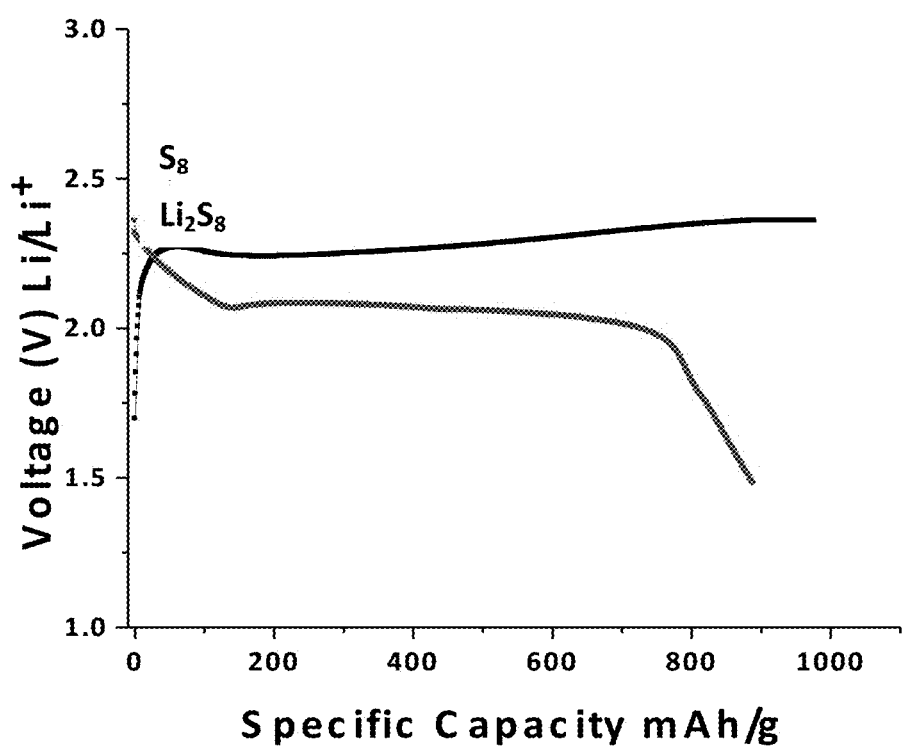
FIG. 10 shows charge/discharge of sulfur-carbon composite.
Figure 11:
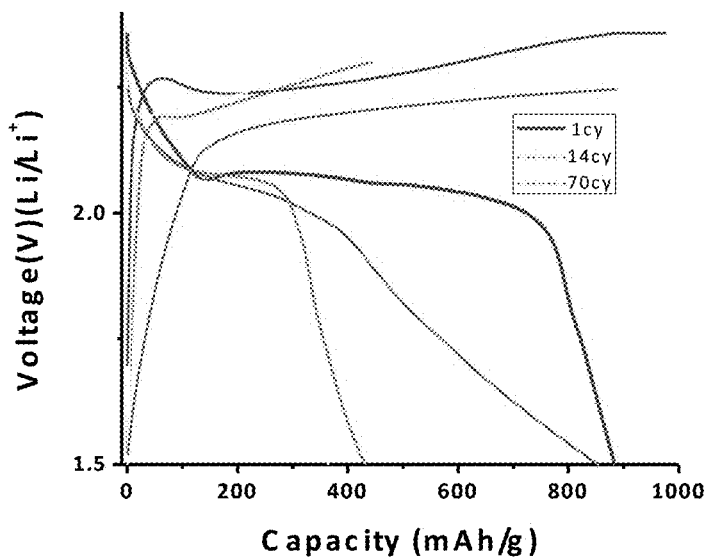
FIG. 11 shows charge/discharge at different scan rate.
Figure 12:
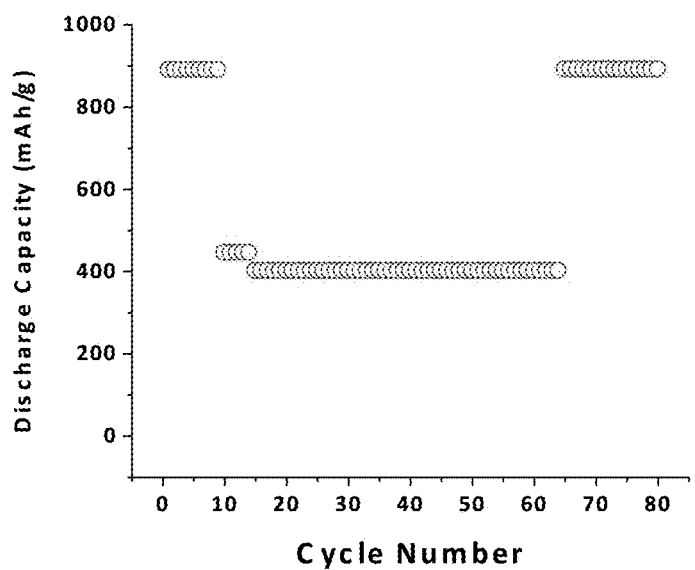
FIG. 12 shows cycleability of the sulfur-carbon nanocomposite at different scan rate.
Figure 13:
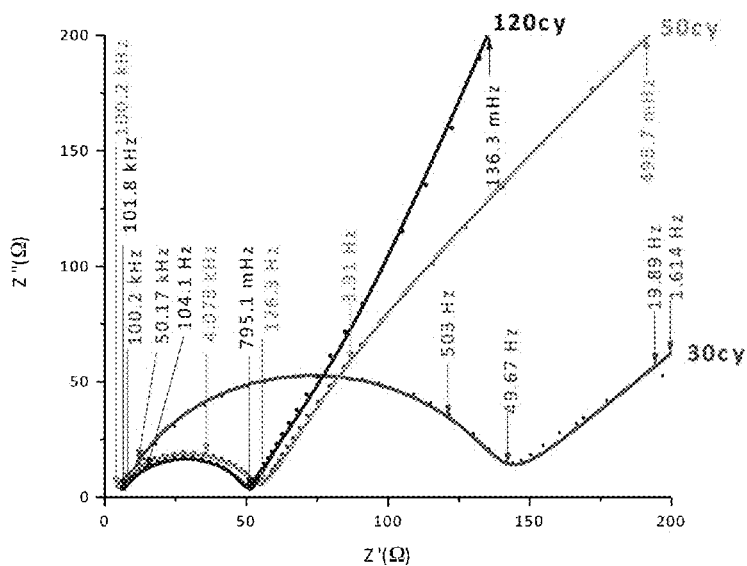
FIG. 13 shows Nyquist plots of the charged state of a LiS battery with a sulfur-carbon nano-composite cathode different cycles.

The reduction and oxidation plateaus remained relatively constant over 80 cycles as shown in the selected discharge/charge curves in FIG. 10 and FIG. 11, indicating no polarization. The reduced internal impedance also suggests a more reversible cell upon cycling, as shown in the Nyquist plots of FIG. 13, and the data shown in Table 1. To examine the electrochemical cycle performance, cells with the sulfur-carbon nanocomposite cathodes were cycled at current density at 10 mA/g, 30 mA/g and 100 mA/g rates as shown in FIG. 12. High initial discharge capacities of 913 mAh/g (based on S mass), 437 mAh/g (based on S mass), and 413 mAh/g (based on S mass) respectively, at the current densities 10 mA/g, 30 mA/g, and 100 mA/g. High initial discharge capacities attest to high utilization of the active material in the sulfur-carbon cathode, which is attributed to the unique sponge like morphology of the nanocomposite, that allows complete electrolyte penetration. In addition, the highly dispersed sulfur nanoparticles on the carbon surface provide sufficient contact between sulfur and the conductive matrix. Even after 80 cycles, reversible capacities of 912 mAh/g, at 10 mA/g without capacity fading with capacity retention of as high as 94% and Coulombic efficiency of nearly 80% for most cycles was observed (FIG. 12).

The invention claimed is:

1. A method of synthesizing a sulfur-carbon cathode material for a Li-S battery comprising:
    preparing a first precursor solution by ultrasonicating elemental sulfur in a first solvent;
    separately preparing a second precursor solution by ultrasonicating sodium sulfide in a third solvent and fourth solvent;
    mixing said first and said second precursor solutions;
    adding carbon black to the precursors mixture and ultrasonicating to effectively synthesize a carbon-sulfur nanocomposite material.

2. The method of claim 1, wherein said first solvent is Toluene.

3. The method of claim 1, wherein said second solvent is Hexane and said third solvent is ethanol.

4. The method of claim 1, wherein the first precursor solution is ultrasonicated for 30 minutes.

5. The method of claim 1, wherein the second precursor solution is ultrasonicated for 60 minutes.

6. The method of claim 1, wherein the first precursor solution is ultrasonicated at 45° C.

7. The method of claim 1, wherein the second precursor solution is ultrasonicated at 45° C.

8. The method of claim 1, wherein said carbon black and said precursors mixture is ultrasonicated at 45° C.

* * * * *